United States Patent [19]

Diegel

[11] 4,307,643
[45] Dec. 29, 1981

[54] GLASS CUTTING MACHINE HAVING MULTIPLE CUTTING HEADS

[76] Inventor: Herbert F. Diegel, 1524 E. Culver, Phoenix, Ariz. 85006

[21] Appl. No.: 174,010

[22] Filed: Jul. 31, 1980

[51] Int. Cl.³ ............................................. C03B 33/10
[52] U.S. Cl. ...................................... 83/880; 83/169; 83/886; 33/32 C
[58] Field of Search .................................. 83/879–887, 83/169, 564, 482; 225/2, 96, 96.5; 33/32 C

[56] References Cited

U.S. PATENT DOCUMENTS

| | | | |
|---|---|---|---|
| 3,399,586 | 9/1968 | Insolio et al. | 83/881 |
| 4,098,155 | 7/1978 | Insolio | 83/882 |
| 4,175,684 | 11/1979 | Butler | 83/886 X |

*Primary Examiner*—James M. Meister
*Attorney, Agent, or Firm*—Cahill, Sutton & Thomas

[57] ABSTRACT

A machine for cutting glass or other fracture sensitive sheet material includes a support bar for supporting a plurality of cutting heads. The support bar is pivotally connected to a crossbar suspended above the working surface of the machine. The ends of the crossbar are attached to bushing blocks which slide over guide shafts secured to opposite edges of the base of the machine. A lever arm is attached at one end to the support bar for simultaneously pivoting each of the plurality of cutting heads downwardly toward the working surface and for moving the cutting blade heads across the material to be scored. An adjustable stop secured to the crossbar limits the extent to which the support bar can be pivoted by the lever arm, thereby limiting the downward pressure exerted by the cutting heads upon the sheet material. A lubricant reservoir is secured to the base of the machine for simultaneously lubricating each of the cutting heads. A plastic strip of a thickness equal to the sheet material is positioned adjacent an edge of the sheet material to prevent chipping.

20 Claims, 6 Drawing Figures

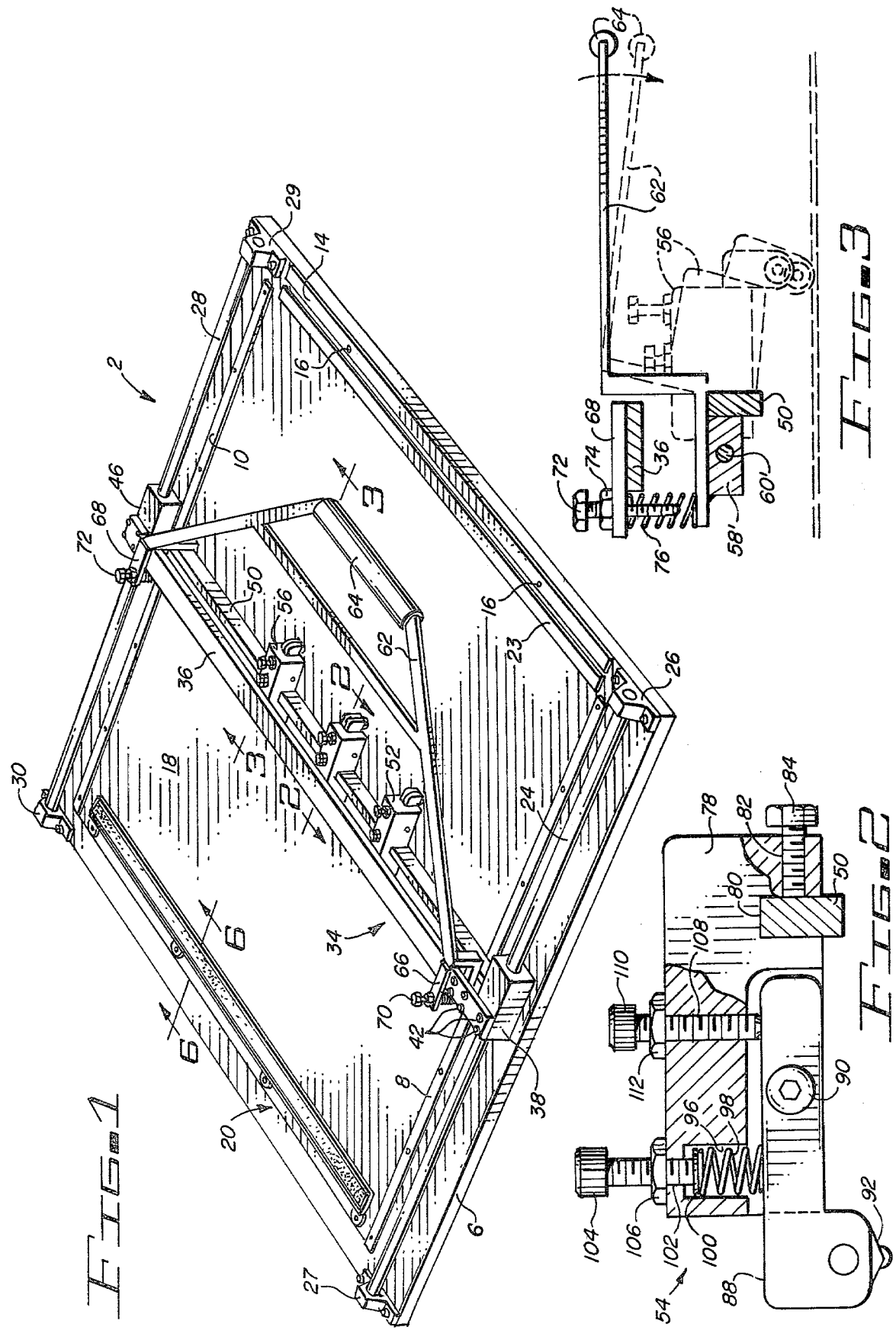

GLASS CUTTING MACHINE HAVING MULTIPLE CUTTING HEADS

BACKGROUND OF THE INVENTION

1. Field of the Invention

The present invention relates generally to scoring glass and other fracture sensitive sheet materials, and more particularly to a cutting machine having a plurality of cutting heads for creating a corresponding plurality of scorelines in such materials.

2. Description of the Prior Art

Cutting machines for scoring glass or other fracture sensitive sheet material (e.g., acrylic sheet) are known to the art. Cutting machines equipped with a plurality of cutting heads for simultaneously creating a plurality of parallel score lines in order to cut multiple strips of such materials are also known and are commercially available from the Fletcher-Terry Company of Farmington, Conn. Typically, the cutting heads used in conjunction with such multiple head cutting machines are of highly complex construction. One type of cutting head commonly used within such machines is pneumatically controlled, and hence the machine requires an air compressor for providing a source of pneumatic pressure. Another type of cutting head used within multiple head cutting machines is disclosed in U.S. Pat. No. 4,098,155, being designated therein as a self-compensating head. The self-compensating cutting head disclosed in the above mentioned patent includes a relatively large number of components and is therefore expensive.

For each of the above mentioned types of cutting heads, the operator must separately adjust each of the plurality of cutting heads if it is desired to change the pressure exerted by each of the cutting heads upon the material to be scored. The time which this procedure requires is, of course, directly proportional to the number of cutting heads attached to the cutting machine and becomes quite lengthy when several cutting heads are being used.

For cutting machines of the type described above, each of the cutting heads typically includes a cutting wheel which is drawn across the sheet material to create a score line therein. Scoring of glass sheets by a cutting wheel alone often results in flakes, slivers, or chips, along the score line, sometimes referred to in the trade as a "hot cut". Such flaking and chipping results in a ragged or rough edge after the glass is broken along the score line. To prevent a hot cut, a lubricant or cutting fluid, such as oil, is commonly applied either directly to the cutting wheel or to the glass sheet immediately adjacent the cutting wheel. The application of oil or other lubricant minimizes chipping along the score line and prolongs the life of the cutting wheel. One difficulty which has been experienced in the prior art is to adequately control the flow of such lubricating fluid. In U.S. Pat. No. 3,850,063, a valved type cutting wheel assembly is provided for regulating the flow of such lubricating fluid. However, the cutting wheel assembly disclosed in the above mentioned patent is necessarily complex and relatively expensive.

Another disadvantage of prior art cutting machines when used to score glass is that they tend to create chips in the edge of the glass. As the cutting wheel within each cutting head reaches thhe edge of the glass, the cutting wheel tends to ride down over the edge which often results in the creation of chips. In order to minimize such chipping at the edges of the glass being scored, the operator of the glass machine typically moves the cutting heads much more slowly as the cutting heads approach the edge of the glass. Although this procedure tends to minimize such chipping, it also lengthens the time required to make each cut, resulting in decreased production efficiency.

Accordingly, it is an object of the present invention to provide a cutting machine having a plurality of cutting heads for scoring a fracture sensitive sheet material while eliminating the requirement for an air compressor and associated pneumatic controls in order to operate the cutting machine.

Another object of the present invention is to provide a cutting machine having a plurality of cutting heads for scoring a fracture sensitive sheet material wherein the plurality of cutting heads are of simple construction and are relatively inexpensive.

Still another object of the present invention is to provide a cutting machine having a plurality of cutting heads for scoring a fracture sensitive sheet material wherein the pressure exerted by each of the cutting heads against the sheet material can be quickly and easily adjusted regardless of the number of cutting heads being used.

A further object of the present invention is to provide a cutting machine having a plurality of cutting heads for scoring a fracture sensitive sheet material wherein the machine can be manually operated with a single handle for simultaneously contacting the plurality of cutting heads against the sheet material to be scored and moving the cutting heads thereacross.

A still further object of the present invention is to provide a cutting machine having a plurality of cutting heads for scoring a fracture sensitive sheet material wherein each of the cutting wheels within the plurality of cutting heads may be simultaneously lubricated in a convenient and non-complex manner.

It is a still further object of the present invention to provide a method of efficiently cutting a fracture sensitive sheet material while minimizing chipping at the edges thereof.

These and other objects of the present invention will become apparent to those skilled in the art as the description thereof proceeds.

SUMMARY OF THE INVENTION

Briefly, and in accordance with one embodiment thereof, the present invention relates to an apparatus for scoring glass and other fracture sensitive sheet materials, the apparatus including a base for supporting the fracture sensitive sheet material. A crossbar extends over the base and is movably supported by first and second guides disposed along first and second opposing edges of the base. A cutting head support bar extends parallel to the crossbar and is pivotally connected thereto. A plurality of cutting heads are attached to the cutting head support bar for creating a corresponding plurality of score lines within the sheet material. A mechanism is provided for controlling pivotal motion of the cutting head support bar in order to simultaneously raise and lower the plurality of cutting heads. Preferably, this mechanism includes a lever arm having one end coupled to the cutting head support bar and equipped with a handle at the opposite end. The handle is used to pivot the cutting head support bar for lowering the cutting heads while simultaneously moving the cutting heads across the sheet material to be scored. The cutting head support bar is biased in a manner to raise the cutting heads when the handle is released. An adjustable stop is provided for limiting the extent to which the lever arm can pivot the cutting head support bar in order to limit the downward pressure applied by each of the cutting heads upon the surface of the sheet material.

Preferably, a lubricant reservoir is mounted to the base extending perpendicular to the first and second opposing edges thereof for simultaneously lubricating each of the plurality of cuttng heads whenever the cutting heads are positioned over the lubricant reservoir and lowered to make contact therewith.

An alignment bar is secured to an edge of the base perpendicular to the first and second opposing edges thereof for maintaining the sheet material is a predetermined position upon the base. An elongated plastic member having a uniform width and having a thickness substantially equal to that of the sheet material being scored is inserted between the alignment bar and an edge of the sheet material proximate to the alignment bar in order to prevent cutting wheels within each of the cutting heads from dropping off of the edge of the sheet material and creating a chip therein.

BRIEF DESCRIPTION OF THE DRAWINGS

FIG. 1 is a perspective view of a cutting machine having a plurality of cutting heads and constructed according to the teachings of the present invention.

FIG. 2 is a cross-sectional view of one of the cutting heads taken through lines 2—2 shown in FIG. 1.

FIG. 3 is a cross-sectional view taken through lines 3—3, as shown in FIG. 1 and illustrates the mechanism used to control movement of the cutting heads.

DETAILED DESCRIPTION OF THE PREFERRED EMBODIMENT

Figure 4:
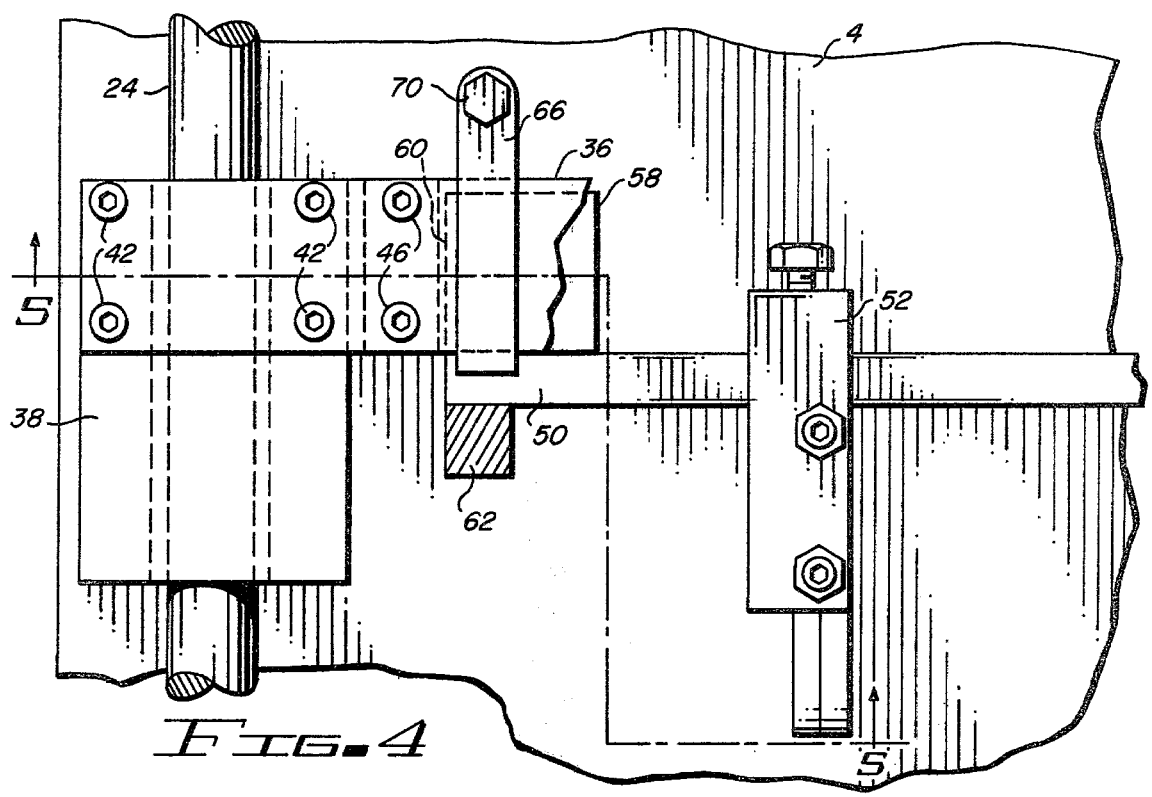
FIG. 4 is a partial top view of the machine shown in FIG. 1.

In FIG. 1, a glass cutting machine, designated generally by reference numeral 2, is shown including a flat base 4 which may be a one-half inch thick aluminum tooling plate. Near a first side edge 6 of base 4, a metal guide bar 8 is secured to base 4. Similarly, a second metal guide bar 10 is secured to base 4 proximate to the opposite edge thereof. Adjacent the front edge 12 of base 4, a removable plate or alignment bar 14 made of mild steel is secured to base 4 by pins 16. Alignment bar 14 may be removed for allowing the machine to accommodate larger pieces of work. The upper surface of base 4 bordered by metal guide bars 8 and 10 and alignment bar 14 provides a working surface for supporting glass or other fracture sensitive sheet material to be scored by the cutting machine. The work surface may be covered by a layer of felt 18 or similar material for protecting the lower surface of the sheet material to be scored.

Figure 6:
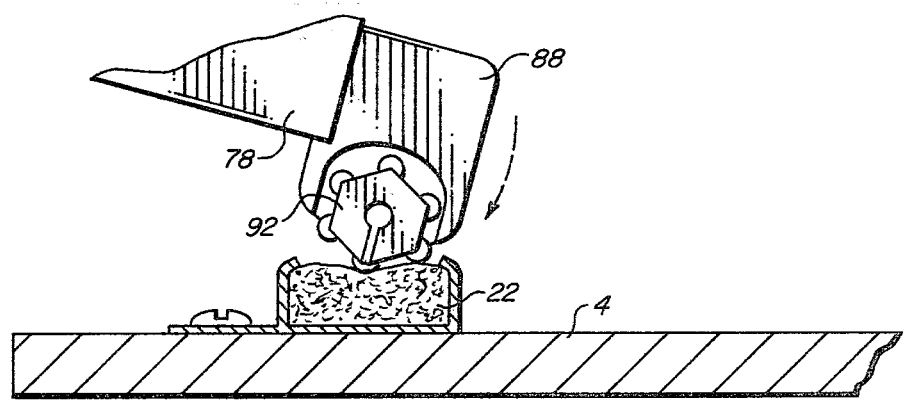
FIG. 6 is a partial cross-sectional view taken through lines 6—6 shown in FIG. 1, and illustrates a cutting wheel assembly within a cutting head being lubricated by a lubricant reservoir.

A lubricant reservoir 20 is secured to base 4 opposite front edge 12. Lubricant reservoir 20 includes an elongated tray 21 extending perpendicular to first side edge 6 of base 4. Disposed within tray 21 is an absorbent, resilient material 22 for storing a supply of lubricant or cutting fluid. The absorbent material may be, for example, sponge or foam rubber. As shown best in FIG. 6, the upper edges of tray 21 curve slightly inward to form a lip for retaining absorbent material 22 therein.

Also shown in FIG. 1 is a plastic strip 23 disposed adjacent alignment bar 14. Plastic strip 23 has a uniform width along its length and is selected to be a thickness equal to that of the sheet material to be scored. The function of plastic strip 23 will be described in further detail below.

Positioned above base 4 and proximate first side edge 6 is a first guide shaft 24. Shaft 24 is supported near front edge 12 by a first raised support 26 secured to base 4. A second raised support 27 is secured proximate the back edge of base 4 for supporting the opposite end of shaft 24. As shown best in FIG. 5, an intermediate raised support 32 may also be secured to base 4 intermediate raised end supports 26 and 27 for supporting shaft 24 therebetween. Similarly, a second guide shaft 28 is supported above base 4 proximate to the edge of base 4 opposite side edge 6. Shaft 28 is supported by raised end supports 29 and 30 and by an intermediate support (not shown). Shafts 24 and 28 may be of the type supplied by Thomson Industries, Inc. of Manhasset, New York, under the designation "Solid 60 Case Hardened and Ground Shafts" for use in conjunction with ball bushings.

Figure 5:
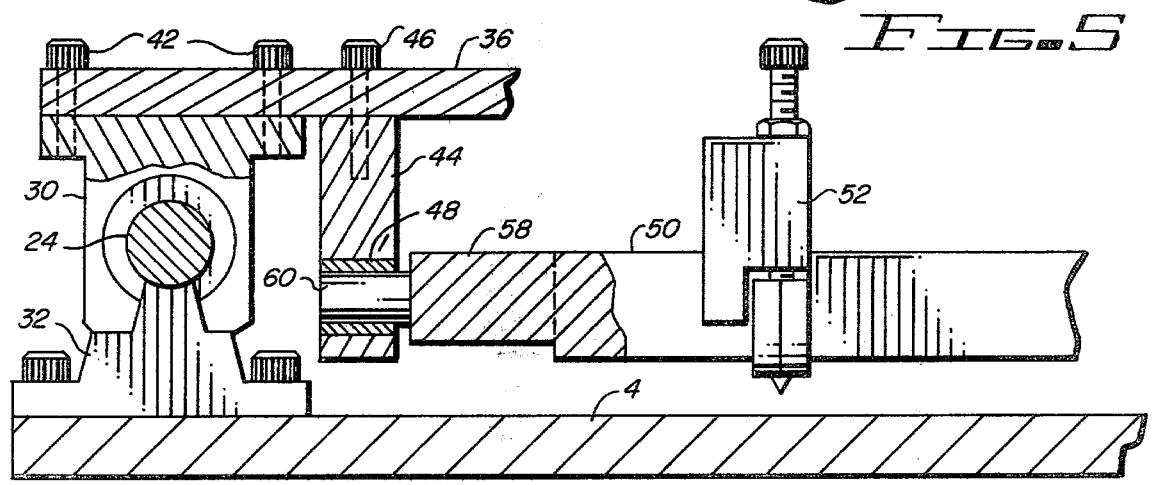
FIG. 5 is a cross-sectional view taken through lines 5—5 shown in FIG. 4.

Referring to FIGS. 1, 4 and 5, a crossbar assembly, designated generally 34, is supported over base 4 by shafts 24 and 28. Crossbar assembly 34 includes a crossbar 36 attached at its ends to ball bushing pillow blocks 38 and 40 by screws 42. Bushing blocks 38 and 40 may be of the type commercially available by Thomson Industries, Inc. of Manhasset, New York, under the designation "TWN-OPN Open Twin Pillow Block". Bushing blocks 38 and 40 are supported by and slide over shafts 24 and 28, respectively. Crossbar assembly 34 may thereby be moved back and forth along a path parallel to shafts 24 and 28. As shown best in FIGS. 4 and 5, a bracket 44 extends downwardly from crossbar 36 adjacent block 38 and is secured to crossbar 36 by screws 46. A bushing or bearing 48 is disposed within the lower portion of bracket 44, the function of which will be described below.

As shown in the drawings, cutting machine 2 includes a cutting head support bar 50 to which a plurality of cutting heads 52, 54 and 56 are removably attached. Referring to FIGS. 3, 4 and 5, rectangularly shaped pivot blocks 58 and 58' are welded to the rear face of cutting bar 50 at first and second ends thereof, respectively. A boss 60 extending from pivot block 58 pivots within bushing 48 of bracket 44. Similarly, a bushing 60' extending from pivot block 58' engates a similar bushing within a bracket at the opposite end of crossbar 36. Thus, cutting head support bar 50 is pivotally connected to crossbar assembly 34 and is supported thereby. Referring to FIG. 3, as cutting head support bar 50 pivots in a clockwise direction, the plurality of cutting heads 52–56 attached thereto are simultaneously lowered toward base 4 for contacting the sheet material to be scored.

In order to pivot cutting bar 50 for bringing each of the cutting heads in contact with the sheet material, a lever arm 62 is provided having a handle 64 at one end. The ends of lever arm 62 opposite handle 64 are welded to the upper face of cutting bar 50 and to the upper faces of pivot blocks 58 and 58', respectively. As shown in FIG. 3, application of downward force to handle 64 causes cutting head support bar 50 to pivot the plurality of cutting heads toward the sheet material to be scored. Due to the leverage provided by lever arm 62, the operator can easily apply adequate downward pressure on the plurality of cutting heads even when a large number of such cutting heads are attached to cutting head support bar 50. In addition, handle 64 of lever arm 62 not only controls downward movement of the plurality of cutting heads, but is also used to simultaneously move the plurality of cutting heads back and forth across the sheet material.

A pair of brackets 66 and 68 are welded to the upper face of crossbar 36 proximate to the points at which lever arm 62 is welded to cutting head support bar 50. The front portion of brackets 66 and 68 each extend slightly forward of cutting bar 36, while the rear portion of brackets 66 and 68 each extend beyond the rear edge of cutting bar 36 by approximately one inch. A threaded bore is provided in the rear portions of brackets 66 and 68 for threadedly engaging bolts 70 and 72. As shown in FIG. 3, a lock nut 74 is disposed between bracket 68 and the head of bolt 72 for locking the position of bolt 72 subsequent to adjustment thereof.

Referring to FIG. 3, a handle 64 is depressed, the portion of lever arm 62 to the left of pivot boss 60' pivots upwardly until it contacts the tip of bolt 72. Thus, bolts 70 and 72 provide an adjustable stop for limiting the extent to which cutting head support bar 50 can be pivoted in the direction for contacting cutting heads 52-56 against the sheet material, thereby adjustably limiting the downward pressure applied by each of the cutting heads against the sheet material. As shown in FIG. 3, a spring 76 is inserted around bolt 72 between bracket 68 and the rear portion of lever arm 62 for biasing cutting head support bar 50 in the direction for raising the plurality of cutting heads away from the sheet material. A similar spring is inserted around bolt 70. When handle 64 is released, lever arm 62 rotates in a counterclockwise direction under the biasing force of the two springs until it contacts the forward edges of brackets 66 and 68 which stop further movement of lever arm 62.

In FIG. 2, cutting head 54 is shown in greater detail. Mounting bracket 78 has a rectangular slot or channel 80 formed in the lower rear portion thereof for engaging cutting head support bar 50. The width of slot 80 is substantially equal to the thickness of cutting bar 50 for enabling mounting bracket 78 to firmly engage cutting bar 50. A threaded bore 82 extends into slot 80 from the rear face of mounting bracket 78, and a fastener 84 threadedly engages bore 82 for clamping mounting bracket 78 in position along cutting bar 50. Preferably, threaded fastener 84 is of the type having a swivel attached to the tip thereof to avoid marring the rear face of cutting bar 50.

A recess 86 is formed in the lower front portion of mounting bracket 78, and a rocker arm 88 is pivotally connected to mounting bracket 78 within recess 86 by Allen head shoulder screw 90. Cutting wheel assembly 92 is attached to the lower front end of rocker arm 88 by a screw 94. As shown best in FIG. 6, cutting wheel assembly 92 is preferably a turret having a plurality of cutting wheels of the type commercially available from Josef Bohle Werkzeugfabrik of Solingen, West Germany and designated "Silberschnitt-HM". Such turrets incorporate a felt washer which contacts each of the plurality of cutting wheels included within the turret assembly. The felt washer retains a small amount of lubricant or cutting fluid which is wiped against each of the cutting wheels whenever they are rotated.

Mounting bracket 78 has a first bore 96 formed in the upper front portion thereof and extending down into recess 86. Spring 98 is inserted within bore 96 for contacting the front end of rocker arm 88 and biasing it away from mounting bracket 78 and toward base 4 of the cutting machine. The upper portion of spring 98 abuts a plate 100 inserted within bore 96. The upper portion 102 of bore 96 is threaded for receiving an adjustment bolt 104, the tip of which contacts plate 100. By varying the extent to which bolt 104 extends within mounting bracket 78, the tension on spring 98 can be adjusted for varying the cutting pressure applied by cutting wheel assembly 92 against the sheet material to be scored. However, those skilled in the art will realize that it is not necessary to readjust bolt 104 each time a change in cutting pressure is to be effected since adjustment bolts 70 and 72 attached to crossbar assembly 34 accomplish this function simultaneously for each of the cutting heads. To prevent bolt 104 from rotating after the proper tension adjustment has been set, a lock nut 106 is threaded onto the shaft of bolt 104 and tightened against monting bracket 78.

A second bore 108 is formed within the upper portion of mounting bracket 78 and extends into recess 86 proximate to the rear end of rocker arm 88. Second bore 108 is threaded for engaging bolt 110, the tip of which contacts the rear end of rocker arm 88 and serves as an adjustable stop for limiting the extent to which rocker arm 88 is moved under the biasing force of spring 98. Lock nut 112 is provided for locking bolt 110 against mounting bracket 78.

During operation of cutting machine 2, a piece of glass or other fracture sensitive sheet material is placed on the working surface 18 of base 4 and properly aligned with respect thereto with the aid of metal guide bars 8 and 10. A plastic stirp 23 having the same thickness as the sheet material to be scored, is selected and inserted between alignment bar 14 and the front edge of the sheet material closest to alignment bar 14. The operator positions the desired number of cutting heads at predetermined points along cutting head support bar 50 corresponding to the desired widths of the strips of sheet material to be cut. Adjustment bolts 70 and 72 are adjusted to select the desired cutting pressure to be applied against the sheet material by each of the cutting heads. The operator then grasps handle 64 and pushes crossbar assembly 34 rearward to position the plurality of cutting heads over lubricant reservoir 20. Handle 64 is then depressed for simultaneously contacting each of the cutting wheel assemblies against lubricant reservoir 20. Following lubrication of the cutting wheel assemblies, handle 64 is raised and pulled forward to position the plurality of cutting heads adjacent the rear edge of the sheet material. The operator then applies downward force on handle 64 to contact each of the cutting wheel assemblies against the sheet material, and the operator simultaneously pulls forward on handle 64 to advance each of the cutting wheel assemblies across the sheet material. When the forward edge of the sheet material is reached, the operator continues to pull forward on handle 64 without slowing down for advancing each of the cutting wheel assemblies off of the sheet material and onto plastic strip 23. Handle 64 is then released and the sheet material is broken along the resulting score lines in a known manner.

Those skilled in the art will now appreciate that a cutting machine has been described which may be equipped with any number of cutting heads for scoring glass or other fracture sensitive sheet material in a convenient manner. The described cutting machine eliminates the need for air compressors and associated pneumatic controls and allows for the use of cutting heads which are of simple and relatively inexpensive construction. Moreover, the cutting pressure exerted by each of the cutting heads against the sheet material may be quickly and conveniently adjusted regardless of the number of cutting heads utilized. It will further be appreciated that the cutting wheel assemblies within the cutting heads may be simultaneously lubricated in a convenient and non-complex manner. It will also be appreciated that a method of minimizing chipping at the edges of the sheet material and increasing production efficiency through utilization of a plastic edge strip has also been described. While the invention has been described with reference to a preferred embodiment thereof, the description is for illustrative purposes only and is not to be construed as limiting the scope of the invention. Various modifications and changes may be made by those skilled in the art without departing from the true spirit and scope of the invention as defined by the appended claims.

I claim:

1. An apparatus for scoring fracture sensitive sheet material, comprising:
   a. a base for supporting the fracture sensitive sheet material, said base including first and second opposing edges parallel to each other;
   b. a plurality of cutting heads for creating a corresponding plurality of score lines upon the fracture sensitive sheet material;
   c. support means extending between and perpendicular to said first and second opposing edges of said base and disposed above said base for supporting said plurality of cutting heads, said support means being movable along a path parallel to said first and second opposing edges of said base;
   d. first and second guide means disposed along said first and second edges of said base, respectively, for engaging said support means and guiding movement thereof;
   e. control means for raising and lowering said plurality of cutting heads relative to said base; and
   f. a lubricant reservoir mounted to said base and extending perpendicular to said first and second opposing edges of said base for simultaneously lubricating each of said plurality of cutting heads when said support means is moved to position said plurality of cutting heads above said lubricant reservoir and said control means lowers said plurality of cutting heads for contacting said fluid reservoir.

2. An apparatus as recited in claim 1 wherein said lubricant reservoir comprises an elongated tray and an absorbent resilient material disposed therein for storing a supply of lubricant.

3. An apparatus as recited in claim 2 wherein said elongated tray includes inwardly projecting lipped edges for retaining said absorbent material therein.

4. An apparatus as recited in claim 2 wherein said absorbent resilient material is foam rubber.

5. An apparatus for scoring fracture sensitive sheet material and minimizing chipping at an edge thereof, comprising:
   a. a base for supporting the fracture sensitive sheet material;
   b. an alignment bar secured to one edge of said base for maintaining the fracture sensitive sheet material in a predetermined position upon said base;
   c. scoring means movably supported upon said base above the fracture sensitive sheet material, said scoring means including at least one cutting head being movable toward said alignment bar across and in contact with the fracture sensitive sheet material for creating at least one score line therein; and
   d. an elongated plastic member having a uniform width and having a thickness substantially equal to the thickness of the fracture sensitive sheet material, said elongated plastic member being disposed upon said base parallel to said alignment bar and positioned between and closely abutting said alignment bar and an edge of said fracture sensitive sheet material, said plastic member preventing said cutting head from dropping off the edge of said fracture sensitive sheet material and creating a chip therein.

6. An apparatus as recited in claim 5 wherein said scoring means includes a plurality of cutting heads for creating a corresponding plurality of score lines within said fracture resistant sheet material.

7. A method of scoring a fracture sensitive sheet material having a predetermined thickness in order to reduce chipping at the edges of said fracture sensitive sheet material, said method comprising the steps of:
   a. placing the fracture sensitive sheet material on a work surface;
   b. providing a plastic sheet member of a thickness substantially equal to the thickness of the fracture sensitive sheet material;
   c. retaining an edge of the plastic sheet member adjacent an edge of the fracture sensitive sheet material; and
   d. moving a scoring tool across the fracture sensitive sheet material toward and onto the plastic sheet member for creating a score line within the fracture sensitive sheet material.

8. An apparatus for scoring fracture sensitive sheet material, comprising:
   a. a base for supporting the fracture sensitive sheet material, said base including first and second opposing edges parallel to each other;
   b. a crossbar extending between and perpendicular to said first and second opposing edges of said base and disposed above said base, said crossbar being movable along a path parallel to said first and second opposing edges of said base;
   c. first and second guide means disposed along said first and second edges of said base, respectively, for supporting said crossbar and guiding movement thereof along said path;
   d. cutting head support means extending parallel to said crossbar and being pivotally connected thereto;
   e. a plurality of cutting heads attached to and supported by said cutting head support means for creating a corresponding plurality of score lines upon the fracture sensitive sheet material; and
   f. control means for pivoting said cutting head support means relative to said crossbar in order to simultaneously raise and lower said plurality of cutting heads for selectively bringing each of said plurality of cutting heads in contact with the fracture sensitive sheet material.

9. An apparatus as recited in claim 8 wherein said first and second guide means comprise first and second shafts, respectively, supported above said base, and wherein said apparatus further includes first and second bushing blocks coupled to first and second ends of said crossbar, respectively, for sliding over said first and second shafts, respectively.

10. An apparatus as recited in claim 8 wherein said control means includes:
   a. biasing means coupled to said crossbar for urging said cutting head support means to pivot in a first direction for raising said plurality of cutting heads away from said base; and
   b. a lever arm having a first end coupled to said cutting head support means and having a second end provided with a handle, said lever arm causing said cutting head support means to pivot in a second direction opposite said first direction for lowering said plurality of cutting heads toward said base when downward force is applied to said handle.

11. An apparatus as recited in claim 10 further including adjustable stop means attached to said crossbar for adjustably limiting the extent to which said cutting head support means can pivot in the second direction and adjustably limiting the downward pressure applied by said plurality of cutting heads to the fracture sensitive sheet material when downward force is applied to said handle.

12. An apparatus as recited in claim 10 wherein said crossbar includes a stop for contacting said lever arm and limiting the extent to which said cutting head support means can pivot in the first direction by the urging of said biasing means.

13. An apparatus as recited in claim 10 wherein said handle further effects movement of said plurality of cutting heads across the fracture sensitive sheet material when force is applied thereto in a direction parallel to said first and second opposing edges of said base.

14. An apparatus as recited in claim 8 wherein said cutting head support means includes a bar having a rectangular cross-section and a predetermined thickness, and wherein each of said plurality of cutting heads has a slot formed therein proximate the rear portion thereof for passing over said bar, the width of said slot being substantially equal to the thickness of said bar.

15. An apparatus as recited in claim 14 wherein each of said plurality of cutting heads further includes a threaded bore extending into said slot and a threaded fastener engaging the threaded bore for clamping each cutting head to said bar.

16. An apparatus as recited in claim 8 wherein each of said plurality of cutting heads includes:
   a. a mounting bracket attached to said cutting head support means, said mounting bracket having a recess formed in the lower portion thereof;
   b. a rocker arm disposed within the recess and pivotally connected to said mounting bracket;
   c. cutting wheel means secured to a first end of said rocker arm for scoring said fracture sensitive sheet material;
   d. biasing means for biasing the first end of said rocker arm away from said mounting bracket and toward said base; and
   e. stop means for limiting movement of the first end of said rocker arm away from said mounting bracket and toward said base.

17. An apparatus as recited in claim 16 wherein said mounting bracket includes a first bore formed in an upper portion thereof and extending toward the recess proximate the first end of said rocker arm, and wherein said biasing means includes a spring extending within said first bore and contacting the first end of said rocker arm.

18. An apparatus as recited in claim 17 wherein the upper portion of said first bore is threaded, and wherein said biasing means further includes a threaded member extending through the threaded portion of said first bore, and a plate disposed within said first bore between said threaded member and said spring, said threaded member allowing for adjustment of the tension of said spring.

19. An apparatus as recited in claim 18 wherein said mounting bracket includes a second bore formed in the upper portion thereof and extending toward the recess proximate a second end of the rocker arm opposite the first end, said second bore having threads formed therein, and wherein said stop means comprises a threaded member extending through said second bore for contacting the second end of said rocker arm.

20. An apparatus as recited in claim 16 wherein said cutting wheel means comprises a turret having a plurality of cutting wheels.

* * * * *